June 12, 1956  R. H. GODDARD  2,749,706
MECHANISM FOR COOLING A COMBUSTION CHAMBER IN PROPULSION
APPARATUS AND FOR FEEDING COMBUSTION LIQUIDS THERETO
Filed Oct. 29, 1953
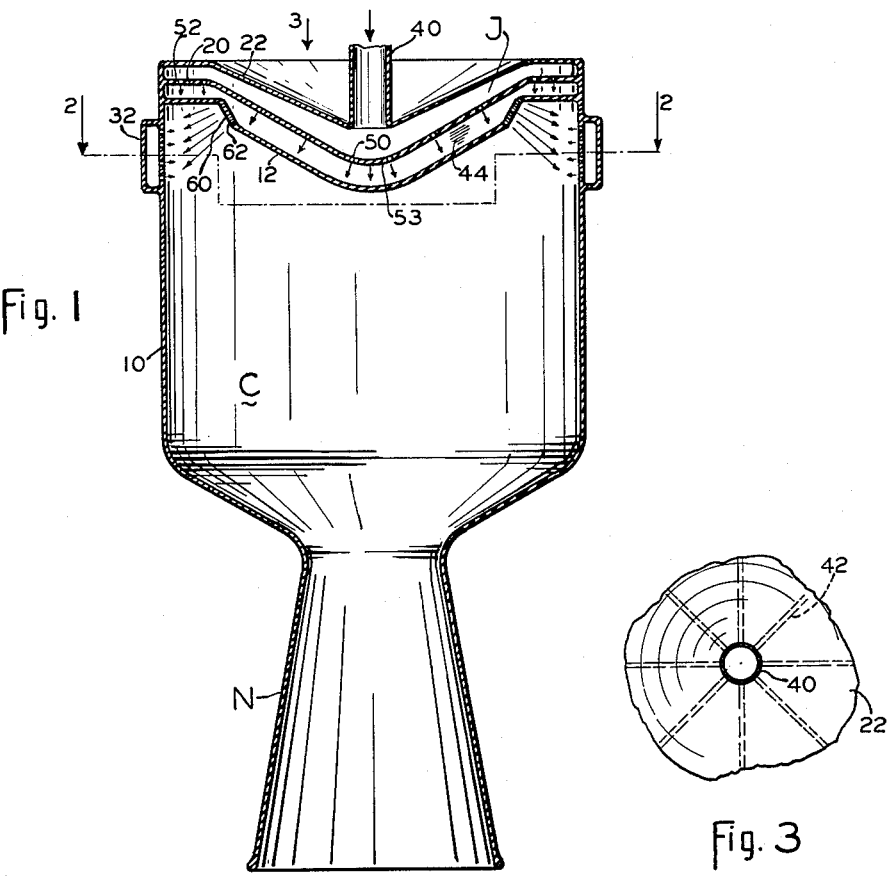
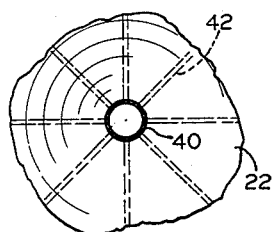
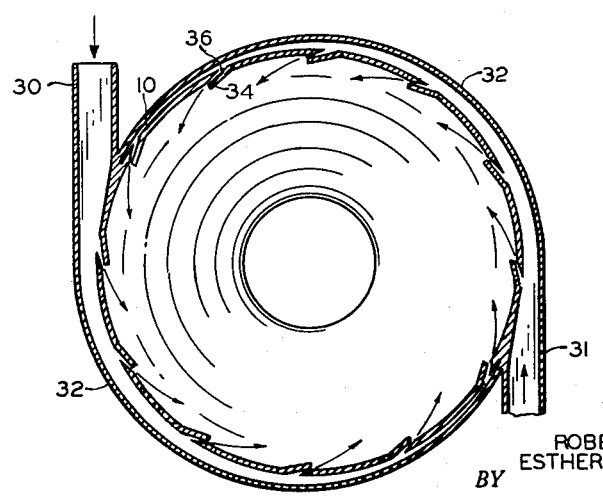
INVENTOR.
ROBERT H. GODDARD, D'C'D.
ESTHER C. GODDARD, EXECUTRIX
BY
Chas. T. Hawley
ATT'Y United States Patent Office 2,749,706
Patented June 12, 1956

2,749,706

MECHANISM FOR COOLING A COMBUSTION CHAMBER IN PROPULSION APPARATUS AND FOR FEEDING COMBUSTION LIQUIDS THERETO

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application October 29, 1953, Serial No. 389,013

2 Claims. (Cl. 60—35.6)

This invention relates to apparatus in which propulsion is attained by continuous combustion of a liquid fuel and a liquid oxidizer in a combustion chamber having an open-discharge nozzle at the end remote from the combustion-liquid feed.

To the attainment of more efficient cooling and feeding operations, provision is made for tangential cooling of the cylindrical side wall of the combustion chamber, and additional provision is made for the jacketing and spray-cooling of the closed or inner end wall of the combustion chamber. Very intimate and effective mixing of the combustion liquids is also attained by the use of this improved mechanism.

The invention further relates to arrangements and combinations of parts which will be hereinafter described and more particularly pointed out in the appended claims.

A preferred form of the invention is shown in the drawings, in which

Fig. 1 is a sectional side elevation of a combustion chamber embodying the invention;

Fig. 2 is a sectional plan view, taken along the line 2—2 in Figure 1; and

Fig. 3 is a partial plan view, looking in the direction of arrow 3 in Fig. 1.

Referring to the drawing, a combustion chamber C comprises a cylindrical side wall 10, a discharge nozzle N, and an end wall 12 for the inner or closed end of the chamber C.

A jacket space J is provided between an inner jacket wall 20 and an outer jacket wall 22. Gasoline or other liquid fuel is supplied through feed pipes 30 and 31 to volutes 32. The chamber wall 10 inside of the volutes 32 has a plurality of inwardly offset projections 34 which provide openings 36 through which gasoline is fed to the combustion chamber in the form of tangential sprays or jets which combine to form a cooling gasoline film effectively protecting the side wall.

The jacket walls 20 and 22 are held in spaced relation by radiating partitions 42 (Fig. 3), and the end wall 12 and inner jacket wall 20 are spaced apart by similar radiating partitions 44 (Fig. 1). The end walls 12, 20 and 22 preferably converge outwardly and are all inwardly displaced and substantially conical in part.

The end wall 20 is provided with numerous holes or spray openings 50 through which liquid oxygen sprays may be directed against the outer surface of the end wall 12 with substantial cooling effect. Preferably the openings 50 are quite closely spaced in the annular peripheral portion 52 of the jacket wall 20 and also in the axial portion 53, as these portions of the wall 12 are most widely heated. Except in these portions 52 and 53, the openings 50 are progressively spaced more widely outwardly in the conical portion.

The inner end wall 12 has an annular portion 60 disposed at a more acute angle with the chamber axis and provided with spray openings 62 through which sprays of oxygen may be projected against the gasoline film supplied through the tangential openings 36.

Very effective intermingling of the two combustion liquids is thus attained and both the chamber side wall 10 and the inner end wall 12 are effectively cooled. The mechanical construction is relatively simple and the parts are so associated that they will firmly resist the thrust of the combustion gases.

Having thus described the invention and the advantages thereof, it will be understood that the invention is not to be limited to the details herein disclosed, otherwise than as set forth in the claims, but what is claimed is:

1. In propulsion apparatus having a combustion chamber with a side wall, a closed end and an open discharge nozzle remote from said closed end, in combination, an inwardly-projecting end wall for said closed end, inner and outer casing members axially outside of said end wall and defining a jacket space and a spray-cooled space, means to deliver a liquid oxidizer to said jacket space, means to spray said liquid oxidizer into said spray-cooled space, spray means located in said closed end wall and effective to spray said oxidizer from said spray-cooled space radially outwardly and towards that portion of the combustion chamber side wall which is adjacent the closed end of said combustion chamber, and means to provide a cooling film of liquid fuel within said combustion chamber and adjacent that portion of said side wall thereof.

2. The combination in propulsion apparatus as set forth in claim 1, in which the end wall of said combustion chamber has a frusto-conical portion, and in which the spray means comprises a series of spray openings formed in said frusto-conical portion of said end wall, which portion is separated from the combustion chamber side wall by an annular flat portion of said end wall.

References Cited in the file of this patent

UNITED STATES PATENTS

| 2,286,909 | Goddard | June 16, 1942 |
| 2,456,402 | Goddard | Dec. 14, 1948 |
| 2,476,185 | Goddard | July 12, 1949 |